United States Patent [19]

Page

[11] Patent Number: 4,759,067
[45] Date of Patent: Jul. 19, 1988

[54] ACOUSTIC REGENERATOR

[75] Inventor: Robert E. Page, San Diego, Calif.

[73] Assignee: The United States of America as represented by the Secretary of the Navy, Washington, D.C.

[21] Appl. No.: 787,551

[22] Filed: Oct. 15, 1985

[51] Int. Cl.[4] .................................................. G01L 5/00
[52] U.S. Cl. ......................................... 381/36; 434/6; 434/10; 434/319
[58] Field of Search ............... 381/36, 41, 46; 434/10, 434/319-321, 6; 369/84; 364/578

[56] References Cited

U.S. PATENT DOCUMENTS

| | | | |
|---|---|---|---|
| 2,863,227 | 12/1958 | Chubb et al. | 434/10 |
| 3,040,445 | 6/1962 | McClelland | 434/10 |
| 3,610,798 | 10/1971 | Murphree | 434/6 |
| 3,829,596 | 8/1974 | Murphree | 434/6 |
| 3,835,234 | 9/1974 | Murphree | 434/6 |
| 4,009,523 | 3/1977 | Van Hook | 434/10 |
| 4,281,994 | 8/1981 | Dell et al. | 434/49 |
| 4,389,541 | 6/1983 | Nakano et al. | 381/36 |
| 4,410,917 | 10/1983 | Newdoll et al. | 360/15 |
| 4,464,784 | 8/1984 | Agnello | 381/36 X |
| 4,630,301 | 12/1986 | Hohl et al. | 381/36 |
| 4,698,776 | 10/1987 | Shibata | 381/46 X |

Primary Examiner—Patrick R. Salce
Assistant Examiner—Emanuel Todd
Attorney, Agent, or Firm—Robert F. Beers; Ervin F. Johnston; Thomas G. Keough

[57] ABSTRACT

An apparatus for extracting, storing and repetitively replaying a broadband datasample is fabricated from proven electronic components to assure long term reliability and reproducibility. A broadband acoustic signal is digitized and stored in a RAM until it is loaded with the desired signal. An adjustable clock controls the rate at which the stored signal is loaded and repetitively displayed so that its spectrum and characteristics can be fully analyzed. Appropriate filters are provided on the input and output sides to block incoming signals outside of the range of interest and those signal components attributed to the variable clock. Selection of particular portions of the stored desired signal may be addressed for detailed analysis on a repetitive basis if needed. Thus, any portion of a continuous broadband acoustic signal may be selected for storing and repetitive cycle analyses without introducing distortion that might otherwise be attributed to conventional approaches relying upon mechanical reproduction and recycling devices.

11 Claims, 1 Drawing Sheet

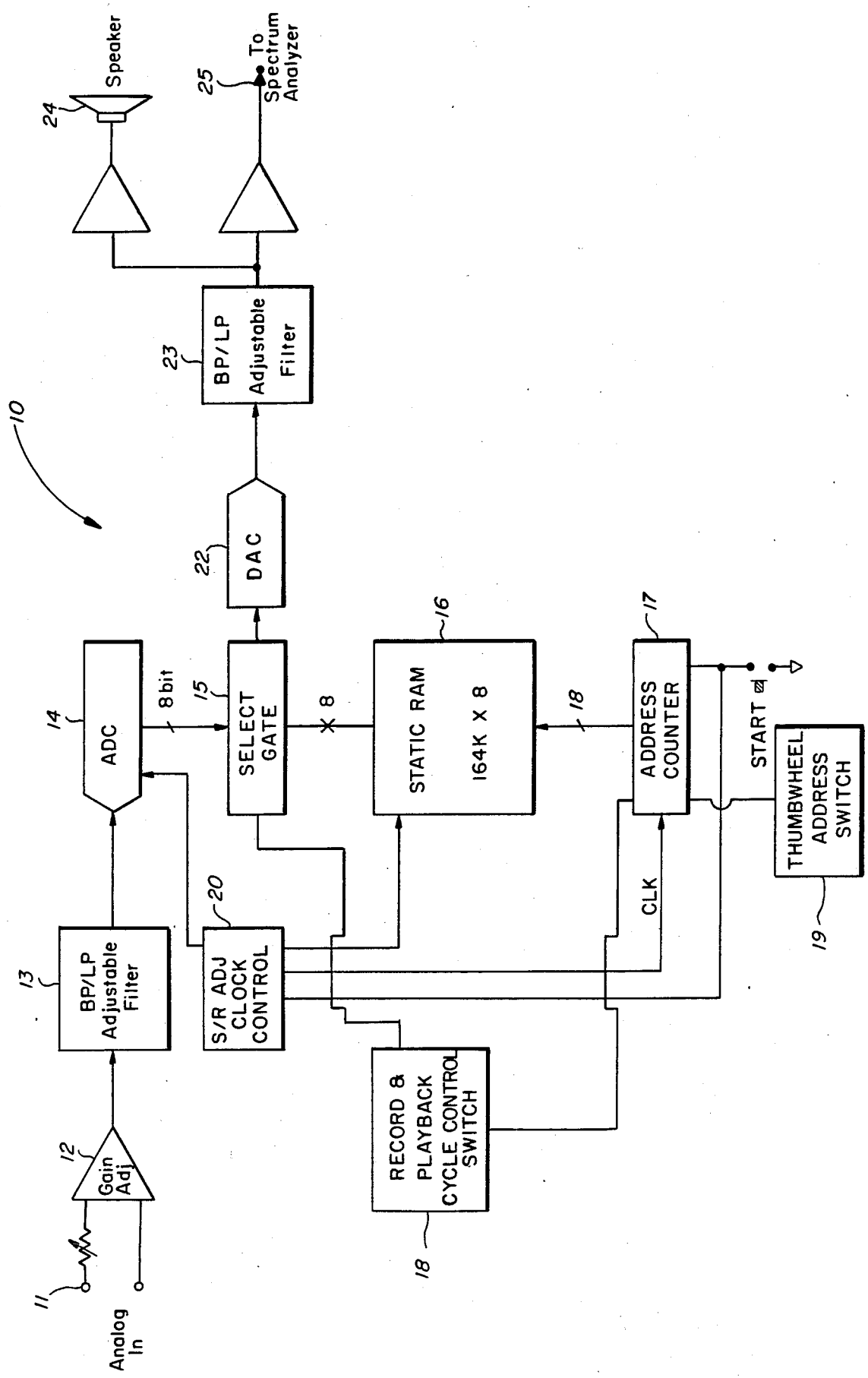

ACOUSTIC REGENERATOR

STATEMENT OF GOVERNMENT INTEREST

The invention described herein may be manufactured and used by or for the Government of the U.S. of America for governmental purposes without the payment of any royalties thereon or therefor.

BACKGROUND OF THE INVENTION

Frequently, designers have the need to record and later analyze the content of a signal of interest. This is particularly true of signals originating in the broadband acoustic spectrum where a considerable number of parameters affect the constituency of the spectrum. One widely used analysis technique relies upon a tape recorder which monitors the signal of interest and stores it for later analysis. While this has proven satisfactory for some applications, those making precise analyses recognize that, in addition to being unduly time consuming, a recycled, recorded tape cannot exactly reproduce a time sequence signal. The tape motion and other mechanical irregularities inherent in the system make it impossible to repeat the exact time cycle. In addition, an electro-mechanical reproduction also influences the reproduced validity required for exacting analysis. Changing the rate of the tape-reproduced data often times is not exact enough for some types of detailed analysis where designers need to more closely examine the spectral content, for example. It is hard for mechanical couplings to speed up or decrease the playback speed so that a precise, reproducible analysis may follow.

Thus, there is a continuing need in the state-of-the-art for an apparatus which allows the sampling of a broadband acoustic signal that does not introduce distortion into the sampled signal and allows a recycled retrieval and display of stored information at different speeds to provide for a more detailed analysis of its signal content.

SUMMARY OF THE INVENTION

The present invention is directed to providing an apparatus for recording and playing back an acoustic data sample of a broadband acoustic signal. An analog to digital converter converts the acoustic data sample into representative digital signals which are stored in an interconnected RAM. A gate is appropriately actuated to switch the representative signals into the RAM during recording and to feed the representative signals to the output of the apparatus when appropriately actuated. An address counter provides for the loading of representative digital signals in the RAM or the playing out of the signals when appropriately actuated by a record and playback cycle control switch. The counter, the RAM and the analog-to-digital converter are under the control of an adjustable clock which determines the rate at which digital signals are stored as well as the rate at which the digital signals are fed to the apparatus output. Adjustable bandpass filters at the input and output of the apparatus assure that only those signals within the range of interest are digitized and that the signal component attributed to the adjustable clock are removed from the signal appearing at the apparatus output for analysis. An interposed digital-to-analog converter feeds the recycled stored digital signals through the adjustable filter at the apparatus output so that the entire recorded information is provided in analog form. An adjustable address switch coupled to the address counter provides the capability for selectively recycling a desired portion of the representative digital data for analysis.

A prime object of the invention is to provide for an improvement in broadband acoustic sampling.

Yet another object is to provide for a broadband acoustic data sampler which enables the spot checking of a broadband information signal for detailed analysis thereof.

Yet another object of the invention is to provide for a broadband sampling device that enables the repetitive analysis of the sampled information at varying rates to assure the detailed analysis thereof.

Still another object of the invention is to provide a broadband acoustic data sampling apparatus fabricated from proven digital circuit components having an electronic stability and reliability for long term operation.

Yet another object is to provide for an apparatus that enables a spot check of that amount of acoustic data to permit spot validation thereof.

These and other objects of the invention will become more readily apparent from the ensuing specification and drawing when taken in conjunction with the appended claims.

BRIEF DESCRIPTION OF THE DRAWING

The drawing sets forth in block diagram the principle constituents of this inventive concept that assure reliable sampling, storing and repetitive anlysis of the data content therein.

DESCRIPTION OF THE PREFERRED EMBODIMENT

Referring now to the drawing, an acoustic regenerator 10 receives an analog signal representative, for example, of an acoustic broadband signal at an input 11. It passes through an operational amplifier 12 having an adjustable gain to bring the signal strength within the range for processing by the following components. A bandpass/lowpass adjustable filter 13 is included to remove unwanted signal components from the signal. A suitable unit is one known in the art as a brick wall lowpass filter marketed by Rockwell International, although a host of other designs could function equally as well.

An analog-to-digital converter 14 is coupled to receive the output from the adjustable filter and convert this analog signal to digital form. A typical unit which has been shown to function satisfactorily is the ADC 80 by Burr Brown. It provides digital signals in a 12 bit format, although for the application to be described below, the unit was coupled to provide an 8 bit representation and functions satisfactorily in this role.

A select gate 15 is connected to receive the output from the analog-to-digital converter and is a standard tristate TTL switch routinely fabricated by one that is skilled in the art. The select gate functions to transmit the output from the analog to digital converter to a static RAM 16 or when properly actuated, transmit the output from the RAM to the output of the acoustic regenerator in a manner to be disclosed below.

The RAM was fabricated in a representative embodiment of this inventive concept to have stacked 2K by eight Intell 2128's to arrive at a 164 kiloword, 8 bits/word, capacity. The RAM was fashioned from the Intell 2128's with 32 kilabites on a circuit board and five boards suitably coupled to arrive at 164 kilowords capacity. Obviously other and greater capacity units could be assembled in a variety of well established ways to arrive at a storage capacity sufficient to hold digital bits which represent a signal of interest.

An address counter 17 is suitably coupled to the RAM to deliver address signals for either switching in or switching out digital signals from the RAM. TTL 74 LS 163's appropriately coupled by one skilled in the art have proven to be satisfactory for this operation.

A record and playback cycle control switch 18 is connected to select gate 15 as well as to address counter 17. This switch provides the necessary control signals to determine what mode of operation of the acoustic regenerator is desired. This is manually switched by an operator to a first mode to record information in RAM 16 by providing the proper actuation control signal to select gate 15. The gate passes representative digital signals to be stored in RAM 16. Another switched mode is chosen when an output of stored digital data from RAM 16 is desired. A switch 18 is actuated by an operator to provide the necessary signal to initiate address counter 17 in a single or repetitive addressing of the contents of the RAM. The address counter moves the stored digital data out of the RAM and through select gate 15. This may be done in a repetitive cycle and the data is not lost in the RAM.

A thumbwheel address switch 19 also is coupled to the address counter to enable an operator to selectively address a desired portion of the digital data stored in RAM 16. The switch is a commercially available hexadecimal thumbwheel switch. For example, a Digitswitch Model 36455013 manufactured by the Pasadena Cal Corp. of Digitran provides a representation of a digital number that, in this case, is a particular location of digital information in RAM 16. The digital number on the hexadecimal switch can be changed by merely rotating the wheels of the switch to effect the most significant digit, the intermediate number digit and the least significant digit.

Acoustic regenerator 10 is controlled by a sample and reading adjustable clock 20. The adjustable clock generates control signals at selective variable rates which control the analog-to-digital conversion rate of analog-to-digital converter 14, the address rate of address counter 17 and the switching of digital information into and out of RAM 16. The adjustable clock rate is predetermined by an operator to vary the operation of the system so that the recording of information occurs at first determined rate that often is a function of the spectral content of the analog information and the reading out rate which is determined not only by the spectral content of the information but whether or not observers wish a slowed down or sped up display of the information for analysis or further processing operations. The adjustable control is fabricated in accordance with well established digital switching techniques routinely practiced by those skilled in the art. Suitably programmed PROMS, microcomputers and the like can be included as the adjusted clock so long as trains of enabling pulses at desired rates are selectively providable for the analog-to-digital converter, the static RAM and the address counter.

A digital-to-analog converter 22 receives the output digital signals from RAM 16 via select gate 15. The digital-to-analog converter can be a DAC 80 by Burr Brown which has functioned satisfactorily for this application although it is evisioned that a number of other units are equivalent for this intended purpose. The DAC 80 has a 12 bit capability but was retailored to provide an 8 bit capability for suitable operation in the acoustic regenerator.

A bandpass lowpass adjustable filter 23, another brick wall lowpass filter by Rockwell International was included to receive the output from the digital-to-analog converter. The filter functioned to remove the signal components attributed to adjustable clock 20 so that they did not interfere with the spectral presentation at the interconnected audiomonitor 24 and spectrum analyzer output 25.

In operation, the acoustic regenerator is started by START switch which initiates a generation of adjustable clock signals from adjustable clock 20. An acoustic broadband signal of a frequency range of interest reaches analog-to-digital converter 14 via input 11, amplifier 12 and bandpass/lowpass filter 13. The digital signals representative of the analog signal information are gated through select gate 15 and into static RAM 16 by appropriate signals coming from address counter 17.

Playing back the stored signals for analysis or other signal processing operations occurs when record and playback cycle control switch 18 is actuated to switch select gate to pass stored digital signals from static RAM 16 onto digital-to-analog converter 22. Address counter 17 provides signals to shift signals representative of the stored signals out of the RAM while still retaining the information content in the RAM. In this regard thumbwheel address switch 19 may be selectively actuated to dial a particular portion of the information out if it is desired.

Digital signals passing through the digital-to-analog converter are reconverted to analog form and unwanted signal components attributed to the adjustable clock are filtered out by adjustable filter 23. Output signals can be audio for audiomonitor 24 and/or visual for analyzer 25 for whatever purposes designers have in mind. For example they can be slowed down to enable a greater spectral analysis, sped up to become suitable for a more specific signal processing operation or combined in manners beyond the scope of this inventive concept. In any event, the complete information content that was sampled from the broadband acoustic signal is made available again and again on a cyclic basis without distortion or other operations normally associated with mechanical storage and playback devices. The RAM-stored information is erased when re-written (recorded again with new data).

Obviously, many modifications and variations of the present invention are possible in the light of the above teachings. It is therefore to be understood that within the scope of the appended claims the invention may be practiced otherwise than as specifically described.

I claim:

1. An apparatus for recording and playing back an acoustic data sample at an output comprising:
   means for receiving analog data signals;
   first means connected to the receiving means for converting the analog signals to representative digital signals;
   means for storing the representative digital signals;
   means interposed between the first converting means and the storing means for selectively gating the representative digital signals to either the storing means or to the output;
   means connected to the storing means for addressing a location in the storing means for the representative digital signals;

means coupled to the selectively gating means and the addressing means for selectively actuating them to feed the representative digital signals into the storing means and to the output; and means connected to the first converting means, the storing means and the addressing means for providing variable clocking signals therefor to vary the recording rates in the storing means and playing back rates of the stored representative digital signals at the output.

2. An apparatus according to claim 1 further including:

second means interposed between the selectively gating means and the output for converting the representative digital signals to representative analog signals.

3. An apparatus according to claim 2 further including:

means interposed between the second converting means and the output for filtering out a signal component attributed to the clocking signal providing means.

4. An apparatus according to claim 3 further including:

means interposed between the analog data signal receiving means and the first converting means for filtering out analog signals beyond a range of interest.

5. An apparatus according to claim 4 further including:

means coupled to the addressing means for selectively addressing an address therein for the appropriate representative digial signals in the storing means.

6. An apparatus according to claim 5 further including:

means connected to the addressing means and the clocking signal providing means for initiating operation thereof.

7. An apparatus according to claim 6 further including:

means coupled to the output for generating audio and visual indications of the data transmitted thereto.

8. An apparatus according to claim 7 in which the storing means is a static RAM and the addressing means is an address counter suitably connected to the RAM to effect the loading thereof with the representative digital signals.

9. An apparatus according to claim 8 in which the first converting means is an analog-to-digital converter and the selectively gating means is a gate having the capability to connect the representative digital signals from the analog-to-digital converter to the RAM and the capability for coupling stored representative digital signals from the RAM to the second converting means a digital-to-analog converter.

10. An apparatus according to claim 9 in which the selectively actuating means is a recording or playback switch that is switchable to effect either the recording of representative digital signals in the RAM or the recycled playing back thereof from the RAM and the selectively addressing means is a thumbwheel switch to provide address signals for the address counter that correspond to a particular location therein of the desired representative digital signals.

11. An apparatus according to claim 10 in which the initiating means is a switch, both filtering means are bandpass-lowpass filters and the generating means are audio speakers and spectrum analyzers.

* * * * *